Feb. 9, 1971  MIYOSHI OKAMOTO ET AL  3,562,374
METHOD FOR MANUFACTURING FIBROUS CONFIGURATION COMPOSED
OF A PLURALITY OF MUTUALLY ENTANGLED BUNDLES
OF EXTREMELY FINE FIBERS
Filed Oct. 17, 1967  4 Sheets-Sheet 1

United States Patent Office 3,562,374
Patented Feb. 9, 1971

3,562,374
METHOD FOR MANUFACTURING FIBROUS CONFIGURATION COMPOSED OF A PLURALITY OF MUTUALLY ENTANGLED BUNDLES OF EXTREMELY FINE FIBERS
Miyoshi Okamoto and Koji Watanabe, Otsu-shi, Yasuhiko Nukushina, Koyoto-shi, and Makoto Konosu, Otsu-shi, Japan, assignors to Toray Industries, Inc., Tokyo, Japan, a company of Japan
Filed Oct. 17, 1967, Ser. No. 675,982
Claims priority, application Japan, Oct. 17, 1966, 41/67,882; Oct. 21, 1966, 41/68,903
Int. Cl. B29d 27/00; D04h 1/64
U.S. Cl. 264—128                                   10 Claims

ABSTRACT OF THE DISCLOSURE

An improved method for manufacturing fibrous configuration used for artificial leather or the like by forming a web mainly composed of a plurality of highly oriented fibrous composites containing at least two different components, forming a felt from the web by entangling the plurality of highly oriented fibrous composite, treating the web with elastic materials and eliminating at least one of the component with suitable solvent.

Figure 1:
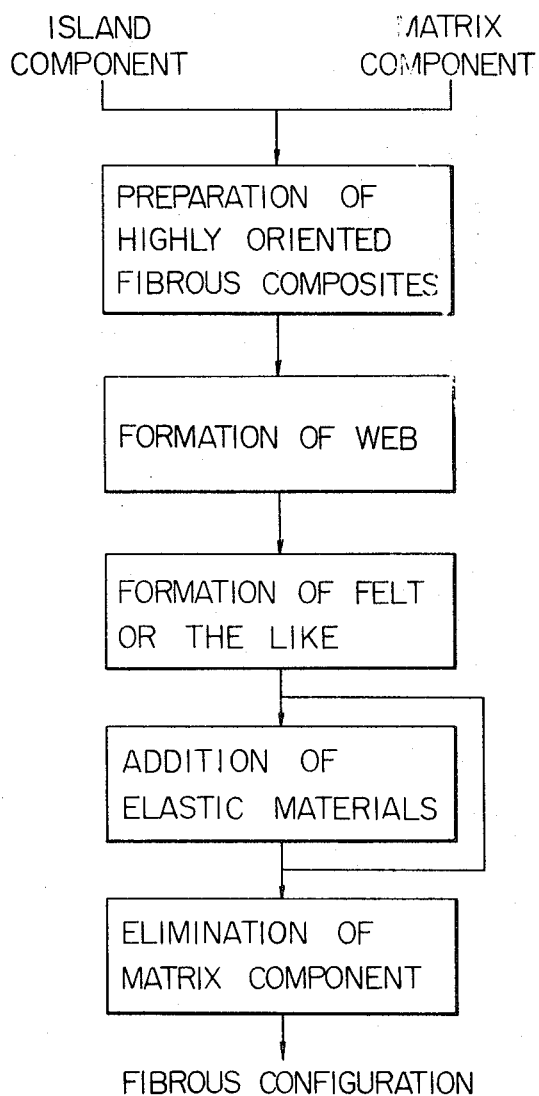

The present invention relates to a method for manufacturing fibrous configuration composed of a plurality of mutually entangled bundles of fine fibers, more particularly relates to a method for manufacturing fibrous configuration used for artificial leather or the like by forming a web mainly composed of a plurality of highly oriented fibrous composites containing at least two different components, needling the web for entangling the plurality of highly oriented fibrous composites, treating the web with a bonding agent in most cases, and eliminating at least one of the components with a suitable solvent.

Many attempts has been made to produce fibrous configuration having the same favourable properties as natural leather, but almost all of such attempts have resulted in failure. All of the artificial leather produced by the conventional method had many unfavourable properties such as less flexibility, hard touch, poor bending strength and permeability etc. The main reason of the failure in the prior art is due to the face that it was very difficult, consequently there have been little attempts, to produce a fibrous configuration composed of a plurality of mutally entangled bundles of fine fibers, such as that found in the structure of natural leather which is composed of very fine collagen fibers. The natural leather is mainly composed of a plurality of mutually entangled bundles of extremely fine collagen fibers, and individual collagen fiber contained in the bundle is not chemically bonded each other permitting slight slippage of the individual fiber within the bundle of fibers when the leather is put under deformation. This is the reason why the natural leather is provided with favourable properties. It is extremely difficult to produce such fine fibers artificially by the conventional spinning method used for producing synthetic fibers. Even if such extremely fine fibers could be obtained artificially, it was quite difficult to produce uniform web or the like using such extremely fine fibers by the conventional webber. Needle punching of the web composed of such extremely fine fibers was almost impossible because such extremely fine fibers could not withstand the impact applied during the punching operation. Moreover, there have been no suitable methods for collecting such extremely fine fibers into a bundle of fibers and, even if such a bundle of fibers could be obtained, it was difficult to make the plurality of bundles of extremely fine fibers into a mutually entangled condition while maintaining the highly oriented condition of fibers contained in the individual bundle of fibers.

The so-called Macaroni fiber or multi-hollow fiber is well-known as a conventional material used for the production of artificial leather so as to bestow preferable flexibility and softness to it. But the conventional Macaroni type fibers are not provided with such continuous configuration of bundles of extremely fine fibers as is observed in the structure of collagen fibers of the natural leather. Consequently, it is impossible to expect to bestow sufficient flexibility, softness and high bending strength to the artificial leather produced from the conventional Macaroni type fibers.

The principal object of the present invention is to provide a method for manufacturing fibrous configuration used as artificial leather or the like and composed of a plurality of mutually entangled bundles of fine fibers at high production efficiency with low production cost in a simple manner.

The other object of the present invention is to provide a novel method for manufacturing fibrous configuration artificially which bestows such preferable properties of natural leather as sufficient flexibility, softness, high bending strength and good permeability effectively while eliminating the drakbacks found in the prior art for manufacturing artificial leather.

Further features and advantages of the present invention will be made apparent from the following descriptions, reference being made to the attached drawings.

Figure 2:
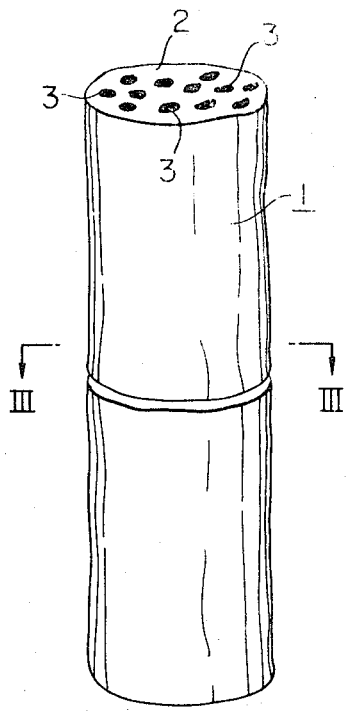
Figure 3A:
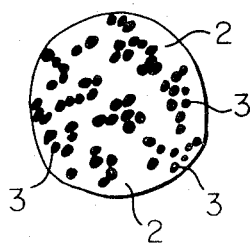
Figure 3B:
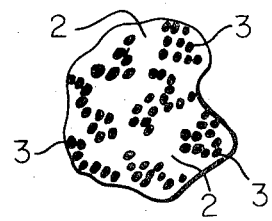
Figure 3C:
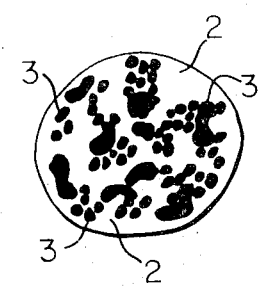
Figure 3D:
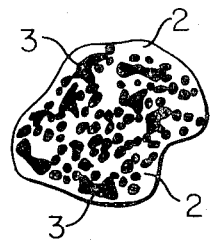
Figure 3E:
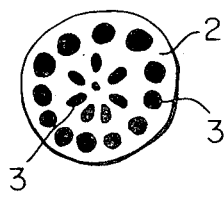
Figure 3F:
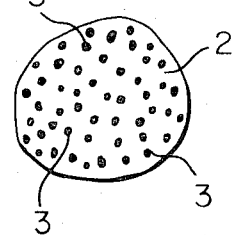
Figure 3G:
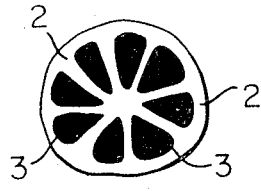
Figure 3H:
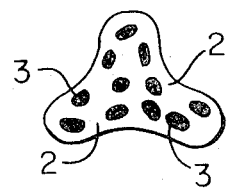
Figure 3I:
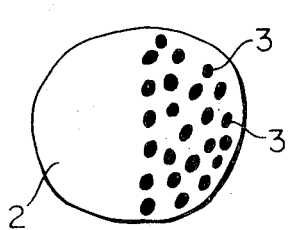
Figure 3J:
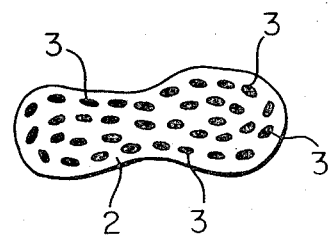
Figure 4:
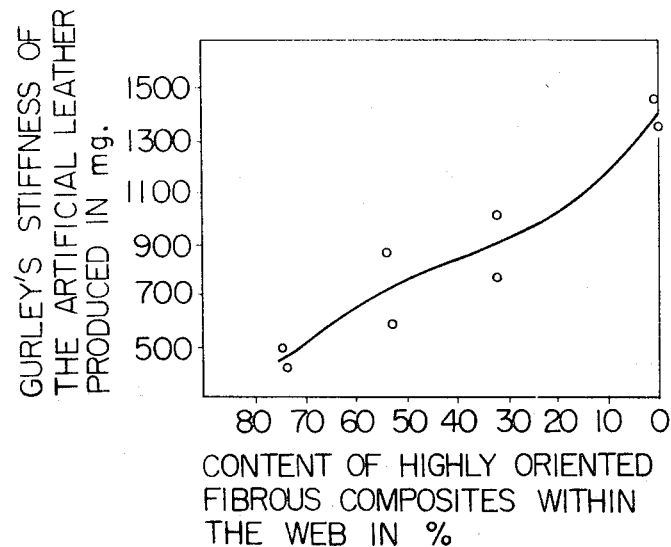
Figure 5:
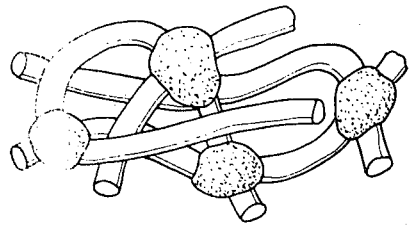

FIG. 1 is a schematic block diagram of an embodiment of the processes for manufacturing fibrous configuration of the present invention, FIG. 2 is a perspective view of a highly oriented fibrous composite of the present invention, FIGS. 3A to 3J are sections taken along the line III—III in FIG. 2, FIG. 4 is a graphical drawing for showing the relation between the content of highly oriented fibrous composites within the web and the stiffness of the fibrous configuration produced thereof, FIG. 5 is an explanatory drawing for showing the entangled condition of fibers in the conventional artificial leather.

Figure 6:
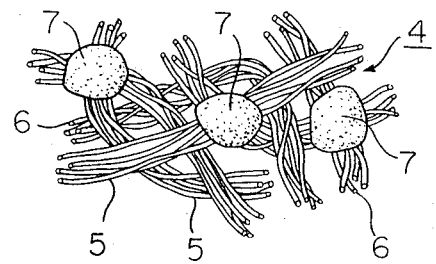
Figure 7:
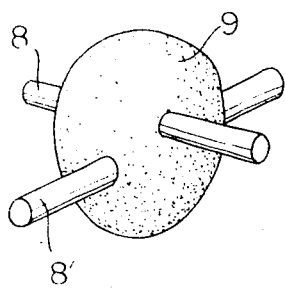
Figure 8:
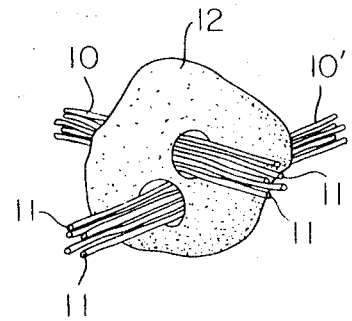
Figure 9:
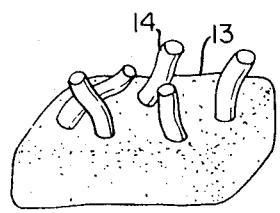
Figure 10:
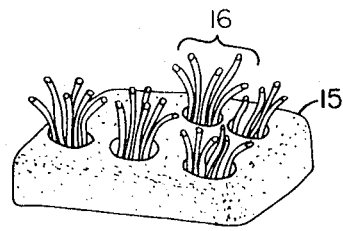

FIG. 6 is an explanatory drawing for showing the entangled condition of bundle of fine fibers in the fibrous configuration of the present invention, FIGS. 7 and 8 are explanatory drawings for showing the bonded condition of fibers in the conventional artificial leather and the fibrous configuration of the present invention, respectively, FIGS. 9 and 10 are explanatory drawings for showing the surface condition of the conventional artificial leather and the fibrous configuration of the present invention, respectively.

In accordance with the present invention, manufacturing of fibrous article comprises the four main processes shown in FIG. 1 following the preparation of highly oriented fibrous configuration, wherein the first process is the formation of random web, the second process is the formation of felt or the like, the third process is the addition of elastic materials and the final process is the elimination of at least one of the components from the products.

The highly oriented fibrous configuration of the present invention can be prepared by; spinning at least two different components simultaneously together through a spinning nozzle in such a manner that the spun filament will have a section shown in FIGS. 3A to 3J; by eliminating or removing at least one of the components from the filaments thus produced, sizing thus produced bundle of very fine multifilaments so as to form one single filament again; or by sizing bundle of very fine multifilament produced by another method, among which the first method being most favourable. One of the components which is eliminated later as hereafter described is called "the matrix component" and the other "the island component" in the following descriptions.

The structure of the highly oriented fibrous composite 1 produced by hte above-described method is shown in FIG. 2, wherein the highly oriented fibrous composite 1 comprises a flexible matrix component 2 and a plurality of flexible fibers or island components 3 distributed within the matrix component 2. The matrix component 2 must be eliminated in the manner hereinafter described to form an elongated bundle of fine fibers composed of only island components. It may be possible to eliminate or remove the island components, but this will result in the formation of multi-hollow fibers which do not fit the purpose of the present invention. The cut length of the highly oriented fibrous composite ranges from 25 mm. to 100 mm., or preferably from 30 mm. to 80 mm., and the thickness of the composite ranges from 1.0 to 20 denier, or preferably from 1.5 to 7 denier, which is approximately equal to that of the fine fibers produced by the conventional method.

The number and the ratio of the island components within the matrix component should be chosen in such a manner that the thickness of the individual fine fibers composed of the island components after the elimination of the matrix component ranges from 0.5 to 0.005 denier, or preferably from 0.10 to 0.01 denier, which is hardly obtained by the conventional method. Some examples of the cross sectional conditions of the highly oriented composite thus produced are illustrated in FIGS. 3A to 3J. It can be clearly understood from the drawings that the sectional profiles of both the highly oriented fibrous composite 1 and the island components 3 are not always limited to circular one which is shown in FIGS. 2 and 3. Several types of deformed sectional profiles of the composite such as shown in FIGS. 3B to 3J can be applied without departing from the object of the present invention. But it should be noted that the sectional profile of a highly oriented fibrous composite, in other words, the condition of the distribution of the island components within the matrix component, is kept approximately constant within the cut length along the composite.

The island and the matrix component of the fibrous composite used in the present invention can be chosen from a group composed of polyester group such as polyethyleneterephthalate, polyethyleneterephthalate-isophthalate copolymer, polyethyleneterephthalate-adipate copolymer, polyethylene terephthalate-phthalate copolymer, polyethylene terephthalate-trimeditate copolymer, polyethyleneterephthalate-sebacate copolymer, polyethyleneterephthalate-succinate copolymer, polyethylene-diethylene glycol copolymer cyclohexane - type - polyester, polyethylenesebacate and polyethylenadipate; polyamide group such as nylon 6, nylon 66, nylon 12, nylon 4, nylon 10, nylon 11, copolymer of nylon 6 with nylon 66, copolymer of nylon 6 with nylon 10, copolymer of nylon 6 with isophthalamide, copolymer of nylon 6 with polyoxiethylene-diamine, copolymer of nylon 66 with polyoxiethylene-diamine, blended polymer of nylon 66 with polyethyleneglycol, blended polymer of nylon 6 with polyethleneglycol, blended polymer of nylon 6 with above described copolymers, blended polymer of nylon 66 with above described copolymers, aromatic polyamides (such as polymethaphenylene-isophthalamide, poly-N-methyl-p-phenyleneterephthalamide); cellulose group such as viscose rayon, viscose from cupraammonium cellulose, cellulose acetate, ciano-ethyl-cellulose; polyvinyl compound group such as polystyrene, polystyrene copolymer, polyacrylonitrilo copolymer containing at least one of methyl-acrylate, methyl-metha-acrylate, ethylacrylate, sodium styrene sulphonate, sodium allyl sulphonate and styrene, polyvinylidenechloride and polyvinyl-alcohol, polyurethane group such as di-phenylmethane-di-isocyanate-type polyurethane, polytetramethylene-glycol-type polyurethane, polyethyleneglycol-type polyurethane, polypropylene-glycol-type polyurethane and toluene-di-isocyanate type polyurethane; polyolefine group such as polyethylene, polypropylene, polyethylene-i-onomer and their copolymers; polyoxialkilene group such as polyethyleneglycol, polypropylene glycol, polyethylene-oxide, polypropyleneoxide, polyoximethylene and polyphenylene; polyfluoro compound groups such as polytetrafluoroethylene (emulsion type), polytrifluoroethylene and polyfluoropropylene. The combination of the island component with the matrix component must be determined in such a manner that only the latter can easily be eliminated as hereinafter described while the island component is remained so as to form fine fibers. But it does not depart from the object of the present invention to make a portion of the matrix component remain even after the elimination process in accordance with the preference in end use.

The highly oriented fibrous composite thus produced is next fed to the web forming process singly or together with other ordinary fibers which can be produced by the conventional production method in accordance with requirement of the end use. Web forming is performed by the conventional web forming equipment such as a carding machine, a cross wrapper or a random webber, among which the random webber is preferably used for distributing fibers uniformly and randomly within the web produced.

Referring to FIG. 4, an example of the relation between the stiffness of the artificial leather produced in the method hereinafter described in details and the blending ratio of the highly oriented fibrous composite with ordinary fibers contained within the web is shown. In the figure, the ordinate designates the stiffness in mg. of the produced artificial leather measured on a Gurley's stiffness tester, while the abscissa designates the content in percent of the highly oriented fibrous composite within the web. In the present case, polyester (polyethyleneterephthalate fiber) is used as the material for the island component and polyamide (nylon 6) is used as the material for the matrix component, the highly oriented fibrous composite is composed of 35% of island components and 65% of matrix component, having a thickness of 4 denier and cut length of 50 mm. 100% of highly shrinkable polyester fibers (polyethyterephthalate-iso-phthalate copolymer) having a thickness of 1.5 denier and cut length of 38 mm. are used as the ordinary fibers. It is obvious from the results shown in the drawing that the higher the content of the highly oriented fibrous composites within the web, the smaller is the stiffness of the artificial leather produced from the web. Consequently, it is possible to control the stiffness of the artificial leather produced according to the requirement of the end use by suitably changing the content of the highly oriented fibrous composite within the web at the stage of web forming. By thus blending ordinary fibers the decrease in tear strength of the artificial leather produced can effectively be avoided. Moreover, it is more preferable to use high tenacity fibers as the ordinary fibers so as to bestow a high tear strength to the artificial leather produced.

The webs thus formed are next fed to the needle punching process or the like for the purpose of forming felts having further complicated dimensionally entangled condition of fibers. Webs composed of the highly oriented fibrous composites of the present invention can be fed to the needle punching process or the like singly or together with another webs felts, woven cloths, knitted cloths, or non-woven fabrics in the overlapped condition for the purpose of obtaining further improved properties such as the smoothness of surface, tear strength, anisotropic stiffness and crease recovery. The density of needle punching can be determined in accordance with the requirement of the end use, and preferably between 200 to 800 needles/cm.² The formation of the felt can also be performed by stitch bonding method using such machines as "Arachne," "Maliwatt," "Malipol" or "ACHV."

After the formation of the felt, the felt is treated with a solution or emulsion of elastic materials such as natural rubber, synthetic rubber such as acrylonitrile-butadiene copolymer rubber, styrene-butadiene copolymer rubber, polychloroprene rubber, polybutadiene rubber, polyisoprene rubber, polyethylenepropylene rubber, acrylate-type copolymer rubber and silicone rubber, polyurethane polyacrylate, polyvinyl acetate and/or polyvinylchloride, so as to fix or band together the fibers or highly oriented fibrous composites to each other at their contact portions or to fill the intervening spaces among such members with such materials. Addition of elastic materials can be carried out by the immersion method, spraying method, foaming method, printing method or coating method in the condition of solution, emulsion or powder, but among these the immersion method is most preferable for the purpose of the prevent invention. Such elastic materials added to the felt are coagulated by any of the well-known methods.

The quantity of the materials added to the felt is determined in accordance with the requirement of the end use, and preferably ranges from 50 to 300% by weight of the total island components contained in the felt to be treated. As a result of this addition of elastic materials, the mechanical property of the fibrous configuration produced is greatly improved.

After the addition of elastic materials, the felt is next treated with a suitable chemical solvent for eliminating or removing the matrix component from the highly oriented fibrous composite contained in the fibrous configuration in a mutually entangled and partially fixed condition. The chemical solvent used for this process should be chosen so that it does not damage the island components and not lower the fixing ability of the elastic materials added to the felt in the foregoing process. The elimination of the matrix component can also be carried out by such physical method as the application of heat in case such materials as nylon 4, alpha-methylacrylonitrile or cellulose are used for the matrix component.

Referring to FIGS. 5 and 6, examples of the entangled condition of fibers in case of the conventional artificial leather or the like and the fibrous configuration of the present invention are shown respectively. Before the elimination of the matrix component, the highly oriented fibrous composites are distributed within the felt in a mutually entangled condition the same as in case of the conventional artificial leather or the like shown in FIG. 5. However, after eliminating the matrix components as described above, each highly oriented fibrous composite is converted into a bundle of fine fibers mainly composed of island components while maintaining the mutually entangled condition in the felt as shown in FIG. 6. Consequently, the resulting fibrous configuration 4 is composed of a plurality of mutually entangled bundles 5 of fine fibers 6, some of which are fixed to each other by a suitable elastic materials 7 at their contact portions.

The fixed portions of the fibers in the conventional artificial leather or the like and the fibrous configuration of the present invention are shown in FIGS. 7 and 8 respectively. In case of the conventional artificial leather or the like, the contact portion of fibers 8 and 8' contained therein are firmly fixed each other by the elastic material 9 fed to the felt, and because each of the contact portion of fiber in the construction is thus firmly fixed by the elastic material, the free movement of individual fibers within the structure is very limited, resulting in poor handling quality and flexibility of the artificial leather or the like produced. While in case of the fibrous configuration of the present invention, the contact portions of highly oriented fibrous composites contained therein are also firmly fixed to each other by the elastic material added to the felt as in case of the conventional artificial leather before the elimination of the matrix component from the composite. It will be well understood that the effective cross sectional area of a bundle of fine fibers obtained by eliminating the matrix component from a highly oriented fibrous composite is smaller than the cross sectional area of the original fibrous composite. So, it can be expected that slight clearances are formed between the bundles 10, 10' of fine fiber 11 and the elastic material 12 after the elimination of the matrix component to liberate or set free the individual fibers as shown in FIG. 8. On account of the presence of such slight clearances, each contact portion of the bundles is dimensionally restricted but is not firmly fixed by the elastic material, and the free movement of individual bundles within the configuration is not as limited as in the case of the conventional artificial leather or the like. Besides, because the slacked condition of the bundle of fibers is not too constricted by the elastic material as described above, the free movement of the individual fibers within the bundle is not very limited also. And the greater freedom of the movement of both of the bundles within the configuration and fibers within the bundles results in improved handling quality, flexibility and permeability of the fibrous configuration produced.

Referring to FIGS. 9 and 10, the enlarged surface conditions of the conventional artificial leather and the fibrous configuration of the present invention are shown respectively. As is obvious from the drawing, the conventional artificial leather or the like is provided with the exposed surface of the elastic material 13 out of which a plurality of end portions 14 of fibers of larger denier contained within the felt are extending, and this results in giving a rough and hard touch to the surface of the artificial leather produced. While in case of the fibrous configuration of the present invention, the exposed surface of the elastic material 15 is provided with a plurality of end portions 16 of fine fibers after the elimination of the matrix component as shown in FIG. 10, and such a great number of distributing ends of fine fibers can provide the fibrous configuration with a velvety surface and deerskin-like touch which could hardly be obtained by the conventional method for producing artificial leather. Instead of adding elastic material to the felt of the present invention, such plastic materials as softened nylon 6, softened polyvinylchloride or polyethylene of low density can also be used without departing from the object of the present invention.

Moreover, the fibrous configuration of the present invention can possess a remarkably improved fatigue limit under bending when compared with the conventional artificial leather or the like because of the fact that the stress concentration can effectively be prevented by diversing the loaded force on individually separated fine fibers.

Preparation of highly oriented fibrous composite can also be performed by sizing the bundle of fine filaments, which can be produced by; spinning the highly oriented fibrous material in the manner already described, eliminating the matrix component to produce bundle of fine filaments, and sizing the bundle of fine filaments; spinning fine filaments by ultra-high-speed-take-up method; drawing fine filaments by super-drawing method; spinning fine filaments by air jet method; and spinning fine filaments by flash spinning method. The bundle of fine filaments thus treated by the sizing agents is next fed to the web forming process, the same as in case of the embodiment shown in FIG. 1, and finally to the desizing process. Usually the sizing agents should be chosen so that the sizing agents applied to the bundle of filaments can be easily eliminated with water, including hot water, or any other low-price chemical solvent or decomposing agent for the sake of reducing production cost. Such materials as starch, polyvinyl alcohol, polyvinyl acetate, polyacrylamide, polyvinylpyrrolidone, polyvinyl-type latex, polybutadiene, polyurethane and polyester can be used as sizing agents of the present invention. In this case, the elastic material added to the felt must be chosen so that it is not eliminated from the fibrous configuration produced together with the sizing agents while eliminating the latter. In case when the fine filaments are composed of polyethyleneterephthalate fiber, di-methylterephthalate, di-methylisophthalate and dimethylorthophthalate can be used as the sizing material using, for instance, alkaline solution as the desizing agent.

The fibrous configuration of the present invention can be provided with further additional properties in accordance with the requirement of the end use by means of passing it through heat pressing, dyeing slicing, coating, water proofing or buffing treatment the same as in case of the conventional artificial leather and the like. Among which the buffing operation is most important for improving the surface condition of the fibrous configuration of the present invention. It is also preferable to bestow crimps to the highly oriented fibrous configuration and performing the conventional scouring by water, drying and softening after the elimination of the matrix component.

The following examples are illustrative of the present invention but are not to be construed as limiting the same.

EXAMPLE 1

The highly oriented fibrous composites are prepared under the processing condition shown in Table 1.

TABLE 1

Island component:
    Composition—Polyethylene-terephthalate containing 0.5% of $TiO_2$.
    Intrinsic viscosity—0.66 (in orthochloro phenol at 25° C.)
    Content—30 parts by weight
Matrix component:
    Composition—Nylon 6 containing 0.5% of $TiO_2$.
    Relative viscosity—2.35 (in sulfuric acid)
    Content—70 parts by weight
Spinning temperature—285° C.
Number of island components in one composite—48
Thickness of a single composite—7.5 denier
Thickness of a single fine filament in the bundle (island)—0.047 denier
Take-up speed—1000 m./min.

After spinning, the highly oriented fibrous composites are drawn with the drawing ratio of 4.1 at a temperature of 175° C., bestowed 12 crimps/inch, heat-set at 120° C. for 30 min. and cut into length of 51 mm. The cut composites are fed to a cross-wrapper to produce webs having weight of 250 g./m.² Four of the webs produced are overlapped together and needle-punched on a locker-room with a punching density of 480 needles/cm.² Then the felt are treated with a 40% solution of NBR latex so as to be bestowed 70% of the latex in relation with the quantity of the highly oriented fibrous composites, and the bestowed latex is coagulated by treating the felt in a 1.5% solution of calcium chloride for 5 minutes. And then the felt is dried at 120° C. for 50 min. after washing at 80° C. for 10 min. with water. After the bonding process, the felt are further treated in formic acid at 24° C. for 30 min. so as to eliminate the nylon 6 matrix component, from the fibrous configuration produced.

The properties of the resulting fibrous configuration are shown in Table 2 together with those of the conventional artificial leather for comparison.

TABLE 2

| | Fibrous configuration of the invention (Example 1) | Conventional artificial leather (comparative Example 1) |
| --- | --- | --- |
| Thickness of individual fibers, denier | 0.047 | [1] 4 |
| Length of individual fibers, mm | 51 | 51 |
| Added elastic material | NBR | NBR |
| Thickness of the product, mm | 1.35 | 1.30 |
| Weight of the product, g./m.² | 456 | 483 |
| Tensile strength, kg./cm.² | 14 | 12 |
| Gurley's stiffness, mg | 350 | 1,850 |
| Bending strength at −5° C. | >1,000,000 | <200,000 |

[1] Nylon 6.

The produced fibrous configuration has a deerskin-like preferable handling and touch with remarkably improved mechanical properties.

EXAMPLE 2

A felt is prepared in the same manner as described in Example 1 using highly oriented fibrous composites obtained in Example 1. Then the felt is treated with a 15% DMF solution of polyurethane so as to be bestowed 55% of polyurethane in relation with the quantity of the highly oriented fibrous composites, and the bestowed polyurethane is coagulated by treating the felt in water at 30° C. for 25 min. And then the felt is dried at 100° C. for 20 min. after washing at 80° C. for 30 min. with water. After the bonding process, the felt is further treated in a solution composed of 70 parts by weight of calcium chloride and 30 parts by weight of methanol at 50° C. for 30 min. so as to eliminate the nylon 6, matrix component, from the fibrous configuration produced. And then the felt was dried after washing with water.

The produced fibrous configuration has a preferable handling and touch like that of natural leather same as in case of Example 1.

EXAMPLE 3

A felt, which is prepared in the same manner as in Example 1, is treated with a 40% solution of NBR latex so as to be bestowed 50% of latex in relation with the quantity of the highly oriented fibrous composite contained in the felt, and the bestowed latex is coagulated by treating the felt in a 15% solution of calcium chloride at 50° for 5 min. After the bonding process, the felt is further treated in a 15% hydrochloride solution at 90° C. for 15 min. so as to eliminate the nylon 6, matrix component, from the fibrous configuration produced. And then the felt is dried after washing with water. Next the fibrous configuration is sliced into layers having the thickness of 0.7 mm. The sliced surface of the layer is coated 350 g./m.² with a coating agent (whose composition is shown in Table 3) and the coating agent is coagulated by immediately immersing the layer into water at 40° C. After coagulation, the surface of the layer is washed, embossed and buffed.

The obtained layer has a coloured-sheepskin-like appearance with preferable handling softness and touch like that of natural leather.

Table 3

Composition of coating agent: Parts by wt.
    Polyurethane _____ 80
    Carbon black _____ 20
    DMF _____ 300

EXAMPLE 4

A felt, which is prepared in the same manner as in Example 1, is treated with the elastic material shown in Table 4 so as to be bestowed 15% of the material in relation with the quantity of the highly oriented fibrous composite contained in the felt and the felt is immediately coated 550 g./m.² with the same coating agent as used in Example 3 so as to make a portion of the coating agent permeate into the felt and the elastic material. Both the elastic material and the coating agent are coagulated by immersing the felt into water of 40° C. for eliminating DMF completely.

Table 4

Composition of elastic material: Parts by wt.
Polyurethane _____ 15
Carbon black _____ 5
DMF _____ 80

After drying, nylon 6 is eliminated in the same manner as in Example 2. And then the felt is dried after washing with water. And the coated surface of the fibrous configuration produced is embossed and another surface buffed by a sand-paper.

The obtained fibrous configuration has a cowskin-like appearance with preferable, softness, handling, touch and durability like that of natural leather.

EXAMPLE 5

The highly oriented fibrous composite ($5^d$ x 38 mm.), which is composed of 50 parts by weight of polyethyleneterephthalate as the island component and 50 parts by weight of nylon 6 as the matrix component, is prepared in the same manner as in Example 1. A web formed from the highly oriented fibrous composite obtained in the same manner as in Example 1 is a needle-punched, bonded with NBR late and treated with a 15% hydrochloride solution for the elimination of the nylon 6, matrix component.

The obtained fibrous configuration has a preferable appearance with preferable handling and touch like that of natural leather.

EXAMPLE 6

The highly oriented fibrous composite ($7^d$ x 76 mm.), which is composed of 30 parts by weight of polypropylene as the island component and 70 parts by weight of polyethyleneterephthalate as the matrix component, is prepared in the same manner as in Example 1. A web formed from the highly oriented fibrous composite in the same manner as in Example 1 is needle-punched, bonded with polyurethane, and treated with a 90% phenol solution for the elimination of polyethyleneterephthalate, matrix component.

The obtained fibrous configuration has a preferable appearance with preferable handling and touch like that of natural leather.

EXAMPLE 7

The highly oriented fibrous composite ($5.7^d$ x 51 mm.), which is composed of 60 parts by weight of polyethyleneterephthalate as the island component and 40 parts by weight of polystyrene as the matrix component, is prepared in the same manner as in Example 1 with the exception that the number of island components in one composite is 72. A web formed from the highly oriented fibrous composite in the same manner as in Example 1 is needle-punched, bonded with polyurethane, and treated with trichloroethylene for the elimination of the polystyrene matrix component.

The obtained fibrous configuration has a deerskin-like appearance with preferable handling and touch like that of natural leather.

EXAMPLE 8

The highly oriented fibrous composite ($4.7^d$ x 51 mm.), which is composed of 50 parts by weight of nylon 6 as the island component and 50 parts by weight of polystylene as the matrix component, is prepared in the same manner as in Example 7. A web formed of the highly oriented fibrous composite in the same manner as in Example 7 is needle-punched, bonded with polyurethane, and treated with perchloroethylene for the elimination of the polystyrene, matrix component.

The obtained fibrous configuration has a preferable appearance with preferable handling and touch like that of natural leather.

EXAMPLE 9

A web is formed of 75 parts by weight of highly oriented fibrous composite ($1.5^d$ x 38 mm.) obtained in Example 1 and 25 parts by weight of high shrinkable polyethyleneterephthalate-type copolymer, needle-punched, bonded with NBR latex, and treated with 15% hydrochloride solution for the elimination of the nylon 6, matrix component. After the elimination of the matrix component, the produced fibrous configuration is treated with boiling water for the purpose of obtaining high density configuration by shrinking polyethyleneterephthalate copolymer fibers, which presented a deerskin-like appearance with preferable handling and touch like that of natural leather.

EXAMPLE 10

The highly oriented fibrous composites, which are composed of 30 parts by weight of polyethyleneterephthalate (island) and 70 parts by weight of nylon 6 (matrix), are treated in formic acid for the elimination of nylon 6. The resulting bundle of filaments contains 48 filaments of 0.047 denier. Then the bundles of filament are sized with partially saponificated polyvinyl-alcohol, bestowed from 5 to 12 crimps/inch of crimps on a stuffing box type crimping machine after drying completely, and cut into length of approximately 48 mm. The sized bundles thus prepared are fed to a random webber to produce webs having a weight of 650 g./m.², and punched by needles with a punching density of 450 needles/cm.². Then the felt is treated with a 25% DMF solution of polyurethane so as to be bestowed 250 g. of polyurethane, treated with hot water and then heat-pressed. This felt is next treated with water for the purpose of desizing.

The produced fibrous configuration has a superior deerskin-like handling, together with an improved bending strength of over one million times when measured on the "Nikka" type bending tester, while that of the conventional leather is from 200,000 to 500,000 times.

EXAMPLE 11

The bundle of filament obtained by the high speed take up spinning system and containing 10 filaments of nylon 6 of 0.9 denier is sized with CMC sizing material, and cut into staple fibers of 51 mm. for forming web. The web is punched by needles with a punching density of 380 needles/cm.². Then the felt is treated in the same manner as in Example 8, by which the produced fibrous configuration presents a superior deerskin-like handling with improved touch.

EXAMPLE 12

The bundle of filament obtained by the super drawing spinning system and containing 12 filaments of polyethyleneterephthalate of 0.8 denier is sized with polyvinyl-alcohol for forming a web in the same manner as in Example 10.

The produced fibrous configuration shows preferable flexibility like that of natural leather.

Several fibrous configurations of the present invention and of the conventional production method are prepared according to the processing conditions shown in Table 5, and the properties of the resulting products are illustrated in Table 6 for comparison.

TABLE 5

| | Material fiber | Composition (parts by weight) | | Production method | Elastic materials | Thickness of the product in mm. |
|---|---|---|---|---|---|---|
| Example Number: | | | | | | |
| 13 | HOFC | Polyester | 30 | Same as Example 1 | NBR | 0.7 |
| | | Nylon 6 | 70 | | | |
| 14 | HOFC | Same as above | 30 | do | NBR | 1.5 |
| | | | 70 | | | |
| 15 | HOFC | do | 30 | do | NBR | 1.3 |
| | | | 70 | | | |
| 16 | HOFC | do | 30 | do | SBR | 1.4 |
| | | | 70 | | | |
| Comparative: | | | | | | |
| 2 | Ordinary fiber | HS nylon | 50 | Conventional (blended fiber) | NR, 80% | 1.4 |
| | | Nylon 6 | 50 | | NBR, 20% | |
| 3 | do | Same as above | 50 | do | Same as above | 1.5 |
| | | | 50 | | | |
| 4 | do | do | 50 | do | do | 1.4 |
| | | | 50 | | | |
| 5 | do | do | 50 | do | do | 1.4 |
| | | | 50 | | | |
| Example Number: | | | | | | |
| 17 | HOFC | Polyester | 35 | Same as Example 1 | NBR | 1.8 |
| | | Nylon 6 | 65 | | | |
| 18 | HOFC | Polyester | 35 | Same as Example 2 | Polyurethane | 2.1 |
| | | Nylon 6 | 65 | | | |
| Comparative: | | | | | | |
| 6 | Ordinary fiber | HS polyester | 30 | Conventional (blended fiber) | NBR | 1.9 |
| | | Nylon 6 | 70 | | | |
| Example Number: | | | | | | |
| 19 | HOFC | PET | 60 | Same as Example 1 | None | 1.9 |
| | | Polystyrene | 40 | | | |
| Comparative: | | | | | | |
| 7 | Ordinary fiber | Nylon 6 | | do | do | 3.7 |
| 8 | do | PET | | do | do | 1.9 |

NOTE.—NBR=Natural butadiene rubber, SBR=Styrene-butadiene rubber, NR=Natural rubber, PET=Polyethyleneterephthalate, HS=High shrinkable, HOFC=Highly oriented fibrous composites.

TABLE 6

| | Gurley's stiffness, mg. | Handling by grip test, percent | Surface touch by rubbing test, percent |
|---|---|---|---|
| Example Number: | | | |
| 13 | 435 | ¹100 | ¹100 |
| 14 | 601 | ¹100 | ¹100 |
| 15 | 959 | ¹100 | ¹100 |
| 16 | 1,444 | ¹100 | ¹100 |
| Comparative: | | | |
| 2 | 2,500 | ²100 | ²100 |
| 3 | 3,150 | ²100 | ²100 |
| 4 | 2,300 | ²100 | ²100 |
| 5 | 3,150 | ²100 | ²100 |
| Example Number: | | | |
| 17 | 1,043 | ¹100 | ¹100 |
| 18 | 1,518 | ¹100 | ¹100 |
| Comparative: | | | |
| 6 | 3,889 | ²100 | ²100 |
| Example Number: | | | |
| 19 | ³25 / ⁴17 | ¹100 | ¹100 |
| Comparative: | | | |
| 7 | ³193 / ⁴133 | ²100 | ²100 |
| 8 | ³183 / ⁴153 | ²100 | ²100 |

¹ Good.  ² Poor.  ³ A.  ⁴ B.

In the table, A designates Gurley's stiffness of the sample taken along the direction of the product delivery from the machine, while B designates Gurley's stiffness of the sample taken along the direction perpendicular to the products delivery from the machine.

Handling and surface touch are both indicated by the percentage of the examiners who examined the sample as described in the table in relation to the total number of the examiners.

What is claimed is:

1. A method of manufacturing a fibrous article for use in manufacturing synthetic leather and the like comprising: providing a plurality of flexible and elongated fibrous composites each comprising a bundle of fibers contained in and confined against relative movement by a matrix component; entangling together said plurality of flexible and elongated fibrous composites; and liberating the fibers within individual bundles of fibers for relative movement with respect to each other by removing along the axial length of the entangled together fibrous composites at least a portion of said matrix component to produce a fibrous article.

2. A method according to claim 1; wherein said providing step comprises providing a plurality of flexible and elongated fibrous composites each comprising a bundle of fibers composed of a first material contained in and confined against relative movement by a matrix component composed of a material different from said first material.

3. A method according to claim 1; wherein said entangling step comprises entangling said plurality of flexible and elongated fibrous composites together with other fibers composed of a material different from that of said fibrous composites.

4. A method according to claim 1; further including buffing at least one surface of said fibrous article.

5. A method according to claim 1; further including bonding together with elastic material at their contact points the entangled together composites; and coating at least one surface of the bonded together fibrous article with polyurethane before said removing step.

6. A method according to claim 1; further including slicing said fibrous article into layers.

7. A method according to claim 1; further including, prior to said removing step, bonding together with bonding material at their contact points the entangled together fibrous composites; and wherein said removing step comprises removing substantially all said matrix component to liberate the fibers within individual bundles of fibers for relative movement both with respect to each other and with respect to said bonding material.

8. A method according to claim 1; further including, prior to said providing step, drawing a bundle of elongated and flexible fibers; and then providing a flexible matrix component around individual fibers of said bundle of elongated and flexible fibers to form a flexible and elongated fibrous composite.

9. A method according to claim 1; further including, prior to said removing step, bonding together with elastic material at their contact points the entangled together fibrous composites.

10. A method according to claim 9; further including, prior to said bonding step, coating the entangled together fibrous composites with polyurethane.

References Cited

UNITED STATES PATENTS

| | | | |
|---|---|---|---|
| 3,020,597 | 2/1962 | Smith-Johannsen | 264—49 |
| 3,116,355 | 12/1963 | Oswin | 264—317 |

FOREIGN PATENTS

| | | | |
|---|---|---|---|
| 1,066,061 | 4/1967 | Great Britain | 264—49 |
| 1,495,835 | 8/1967 | France | 264—49 |
| 6,512,918 | 9/1966 | Netherlands | 264—49 |

PHILIP E. ANDERSON, Primary Examiner

U.S. Cl. X.R.

117—140, 161; 161—157, 159; 260—2.5; 264—49, 109, 129, 158, 174, 210, 282, 344